March 15, 1938.  M. MELAMID  2,110,887
METHOD OF CONVERTING CARBONACEOUS AND HYDROCARBONACEOUS
PRODUCTS INTO PRODUCTS OF A LOW BOILING POINT
Filed July 21, 1934
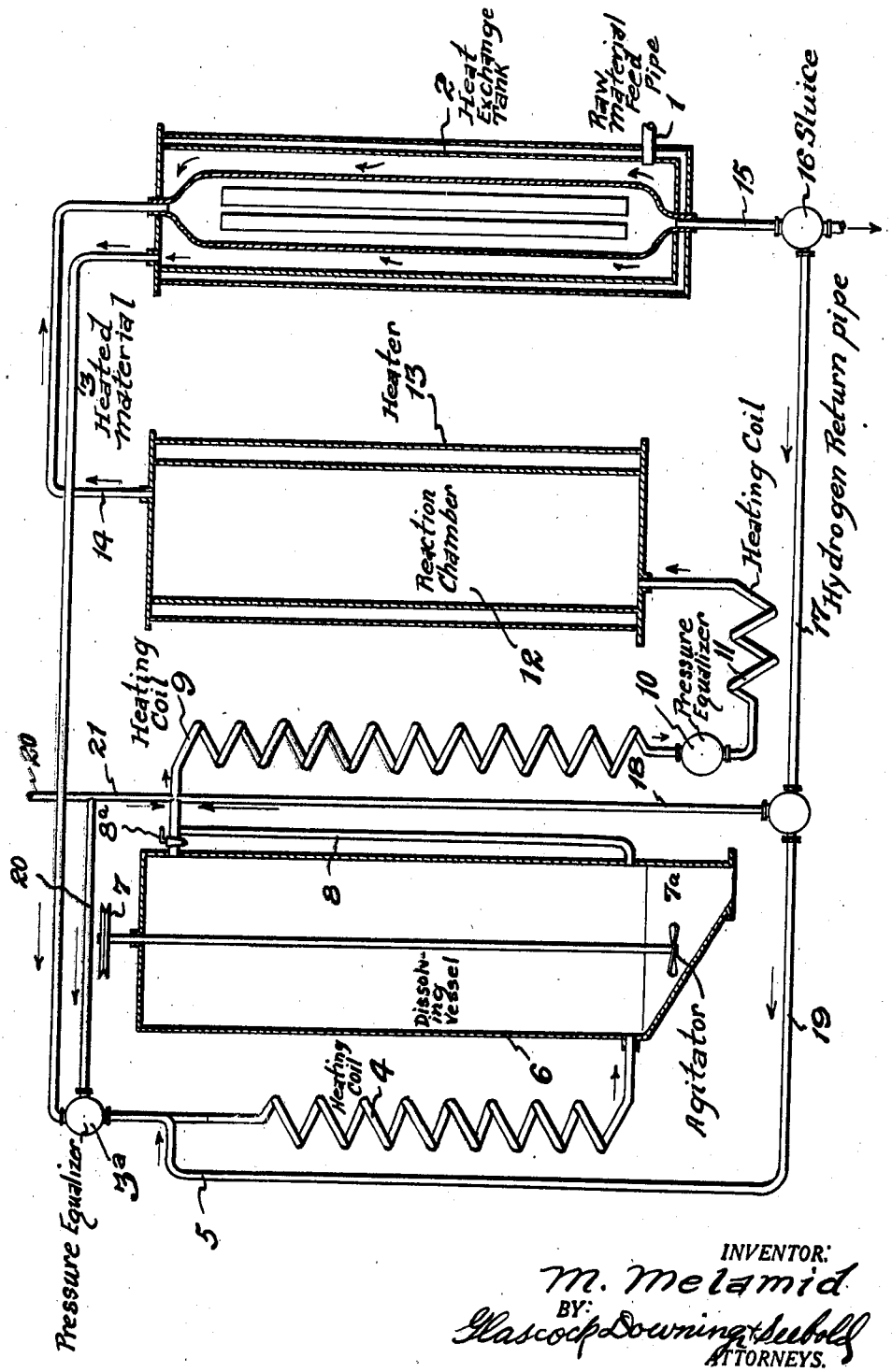
INVENTOR:
M. Melamid
BY:
Glascock Downing + Seibold
ATTORNEYS.

Patented Mar. 15, 1938

2,110,887

UNITED STATES PATENT OFFICE 2,110,887

METHOD OF CONVERTING CARBONACEOUS AND HYDROCARBONACEOUS PRODUCTS INTO PRODUCTS OF A LOW BOILING POINT

Michael Melamid, Zehlendorf, near Berlin, Germany

Application July 21, 1934, Serial No. 736,433
In Germany April 29, 1929

5 Claims. (Cl. 196—53)

The present invention relates to a method of converting carbonaceous and hydrocarbonaceous products into fluid products or products of a lower boiling point.

It has been proposed to convert carbonaceous products, such as coals, tars and residues and hydrocarbonaceous products, such as mineral oils, tar oils and the like into fluid products or products of lower boiling points by treating with decomposition agents or catalysts at a suitable pressure and temperature and in the presence of hydrogen. This process is usually carried out in the manner, that the substances to be treated are introduced into reaction vessels in which they are brought into contact with metallic decomposing agents or catalysts in the presence of hydrogen or hydrogeneous gases or vapors.

It is also known, to introduce the substances to be treated in finely divided state into the reaction vessels.

I have now found, that especially good results are obtained when a suitable decomposing agent or catalyst is dispersed or colloidally dissolved in the substance to be treated. It is for instance possible to use a colloidal metal such as colloidal tin, vanadium or thallium as a decomposing agent. The treatment may for instance be carried out in the manner, that colloidal tin, vanadium, or thallium is dispersed in a mineral oil or the like, whereupon the mixture together with hydrogen in excess is injected into the reaction vessel in which a treatment at raised temperature and raised pressure takes place.

It is also possible to atomize a colloidal solution or a dispersion of a decomposing agent into the carbonaceous medium to be treated by means of hydrogen or hydrogeneous gases or vapors and thereupon to carry out the reaction, which eventually may take place at raised temperature and raised pressure.

The essential features of the invention are the following:

The metals for example tin are used as catalyst and in the form of finely divided colloidal tin;

The substance to be converted and the catalyst are mixed before injecting into the reaction vessel;

The mixture is subsequently introduced into a reaction zone by means of hydrogen or gases containing hydrogen;

The solution in this reaction zone is subjected to raised temperature and raised pressure.

Examples

1. In 100 kg. of coal tar oil, 0.5 kg. of tin are dissolved or dispersed colloidally, the oil being poured into the finely divided metal and the mass being thoroughly mixed by mechanical means.

By means of hydrogen this mixture is conducted into a reaction vessel in which it is subjected to a pressure of 5–20 atmospheres at a temperature of 700–800° C.

2. In 100 kg. of lignite tar, 100 g. of vanadium are dissolved or dispersed colloidally in the manner disclosed above. By means of hydrogen this mixture is blown into a reaction vessel and for some hours subjected to a pressure of 10–15 atmospheres at a temperature of 400–500° C.

3. In 100 kg. of mineral oil fractions of a medium boiling point 100 g. of thallium are dissolved or dispersed colloidally in the described manner. The product is thereupon by means of hydrogen injected into the reaction vessel in which it for some hours is subjected to a pressure of 5–20 atmospheres at a temperature of 400–460° C.

The purpose of the invention is to convert carbonaceous and hydrocarbonaceous substances into products of lower boiling points.

As catalyst are used metals in finely divided colloidal form.

The substance to be converted and the catalyst are mixed before injecting into the reaction vessel.

The mixture subsequently is introduced into a reaction zone by means of hydrogen or gases containing hydrogen and the solution in this reaction zone is subjected to raised temperature and raised pressure.

An apparatus by means of which the novel process may be carried out, is illustrated schematically, and in part section, by way of example in the accompanying drawing.

The raw material is introduced through pipe 1 into the heat exchange tank 2. After absorbing the heat, the material passes through the pipe 3 over the pressure equalizer or an interposed pump 3a through the heating coil 4 into the dissolving vessel 6. A stirrer or agitator 7, is arranged in the dissolving vessel and intensively stirs or agitates the metal supplied and brings it into chemical reaction with the substance to be decomposed. The unused slime settles in the bottom at 7a. The product mixed with the colloidal metal salt solution passes from the mixing or dissolving vessel 6 through pipe 8 or 8a and the further heater 9 over the pressure equalizer and pump 10 through the further heating coil 11 to the reaction vessel 12. This reaction vessel 12 may have an additional heater 13. The decomposed and treated product then passes from the reaction chamber 12 through the pipe 14 to the heat exchange tank 2 and leaves the same through pipe 15. A sluice is arranged in 16. The liquid and vaporized product is circulated through the sluice in such manner that it can be freed from the gas and especially from the excess hydrogen. The undecomposed substances and the benzine-like decomposed substances are treated per se and if necessary reintroduced in the cycle by the usual means while the superfluous or excess gas, hydrogen, is normally returned through conduit 17 to the working process and introduced through pipe 5 into the heating coil 4.

The additionally used hydrogen is led through the pipe 20 and may be mixed directly with the oil through equalizer 3a or circulated through conduit 21 in other parts of the apparatus.

The reaction takes place at temperatures ranging between 400 and 500° C. and at a pressure of 5 to 20 atmospheres.

I claim:

1. A process of converting liquid bituminous substances into products of lower boiling points, comprising dispersing about .1% or less of a metal selected from the group consisting of thallium and vanadium in colloidal state in the substance to be converted, injecting the mixture together with a sufficient amount of hydrogen into a reaction chamber, and subjecting the charge to a pressure of from 5 to 20 atmospheres and a temperature of from 400 to 500° C.

2. A process of converting liquid bituminous substances into products of lower boiling points, comprising dispersing about .1% or less of a metal selected from the group consisting of thallium and vanadium in colloidal state in the substance to be converted, atomizing the mixture together with a sufficient amount of hydrogen in a reaction chamber, and subjecting the charge to a pressure of from 5 to 20 atmospheres and a temperature of from 400 to 500° C.

3. A process of converting liquid bituminous substances into products of lower boiling points, comprising dissolving about .1% or less of vanadium colloidally in the substance to be converted, injecting the mixture together with a sufficient amount of hydrogen in atomized state into a reaction chamber and subjecting the charge to a pressure of from 5 to 20 atmospheres and a temperature of from 400 to 500° C.

4. A process of converting liquid bituminous substances into products of lower boiling points, comprising dispersing about .1% or less of thallium colloidally in the substance to be converted, atomizing the mixture together with a sufficient amount of hydrogen in a reaction chamber and subjecting the charge to a pressure of from 5 to 20 atmospheres and a temperature of from 400 to 460° C.

5. A process of converting liquid bituminous substances into products of lower boiling points, comprising dissolving about .1% or less of thallium colloidally in the substance to be converted, injecting the mixture together with a sufficient amount of hydrogen in atomized state into a reaction chamber and subjecting the charge to a pressure of from 5 to 20 atmospheres and a temperature of from 400 to 460° C.

MICHAEL MELAMID.